United States Patent [19]

Brandon et al.

[11] Patent Number: 4,675,816
[45] Date of Patent: Jun. 23, 1987

[54] ELECTRONIC METHOD OF LOCATING A FOOTBALL

[76] Inventors: Ronald E. Brandon, 1734 Lenox Rd., Schenectady, N.Y. 12308; James W. Winger, 5728 E. Glen Carla Dr., Huntington, W. Va. 25705

[21] Appl. No.: 769,249

[22] Filed: Aug. 26, 1985

[51] Int. Cl.⁴ ...................... G06F 15/28; A63B 67/00; A63B 67/02
[52] U.S. Cl. .................................. 364/410; 273/32 A; 273/1 E; 273/55 R; 364/516; 342/146; 342/125
[58] Field of Search ............... 364/410, 411, 499, 516; 273/32 A, 1 E, 1 ES, 55 R; 343/12 R, 10

[56] References Cited

U.S. PATENT DOCUMENTS 4,454,583 6/1984 Schneiderham et al. ........... 364/449
4,545,576 10/1985 Harris .............................. 364/516 X Primary Examiner—Jerry Smith
Assistant Examiner—Charles B. Meyer

[57] ABSTRACT

An electronic method is used to determine the location of a football on a playing field using a radio transmitter which is positioned at the end of the football and energized to send signals to dispersed receiving rotating antennas which automatically become positioned to point toward the transmitter and then provide via triangulating methods, signals to a computer that determines and transmits the actual location of the football to selected receivers on or off the football field.

7 Claims, 3 Drawing Figures

ELECTRONIC METHOD OF LOCATING A FOOTBALL

The present method of determining the position of a football on the playing field using chains stretched between two poles is antiquated, slow and not always extremely accurate. This invention corrects this situation and enhances the enjoyment of the game. The concept establishes an electronic grid matrix for a standard football field and utilizes a coordinate method to locate the football. It entails positioning 2 to 4 rotating radio direction finding units at strategic locations within the football stadium. One or more electronic radio transmitters designed to emit a specific frequency are used to mark and locate the football. The direction finding units are so positioned within the stadium and at an elevation that will permit them to scan the entire field. Each is designed to rotate 180° and "home-in" on the transmitter marker. Using triangulation principles, the angle established by any two of the finding units with the marker can be converted into a coordinate value. The location of the football is determined by feeding the coordinate value into a micro-computer which is programmed to translate each specific value into a numerical distance along the sideline. This relative distance of the football with reference to each goal line can be fed via digital displays to any number of remote locations depending upon the specific demands and ultimate design of each installation.

There are various methods and procedures which can be used to implement this system and improve the procedure used to locate the football. One such suggested method would be to have the referee equipped with one or more marker/transmitters. Each such unit would have an "on/off" switch. The referee, or any of the officiating staff, would be responsible for turning the marker "on" and positioning it at the tip of the football to establish its location. This procedure could be followed at any time, or as necessary to comply with the rules and the orderly progression of the game. Sideline indicators and down markers would still be used to permit the players, coaches, officials and fans to visually determine the relative position of the football and first down situation. But, for situations where the status is not obvious, the marker/transmitter direction finding system would be activated and the results utilized to allow the referee to make a positive and accurate determination.

There are other options available and operating procedures would be dependent upon individual preferences and local conditions.

With regard to the method used to display the digital readouts—these can be transmitted to one or many locations. The numerical digital representation of the position of the football on the playing field can be fed to the scoretable, to any number of readouts on the scoreboard, to the announcers making it available to TV audiences and other locations where it would be useful and beneficial to the conduct of the game. These options are only a few of the many applications of the idea. Further, an expanded usage is only limited to the economics of the situation. The method is adaptable to all levels of football from high school to professional games. With regard to the latter, the potential benefits in "time saving" and sports appeal, make it a viable system. Considerable time could be saved over the present methods of determining ball position and first down status. The fans could know instantly whether a "first-down" had been achieved, thus eliminating the delay factor associated with sideline chains.

The micro-computer should include a memory function to permit recall of the last ball position as well as the starting point of the current series of downs.

In accordance with the foregoing, an objective of the present invention is the rapid measurement of the football location in the field.

Another objective is improved accuracy in the determination of the position of the football.

Still another objective is automatic determination of whether a first down has been accomplished.

Yet another objective is the provision of external electronic signals for the scoreboard or TV identifying the ball position and the distance to the first down location.

A further objective of the present invention is the prevention of lost time caused by use of the long-used chain system to determine first down status.

Still a further objective of the present invention is the accurate conduct of a football game even where rain, snow or mud has obliterated the football field yard markers.

The foregoing and other objectives of the present invention will be in part obvious and in part more fully understood in conjunction with the accompanying drawings in which.

Figure 1:
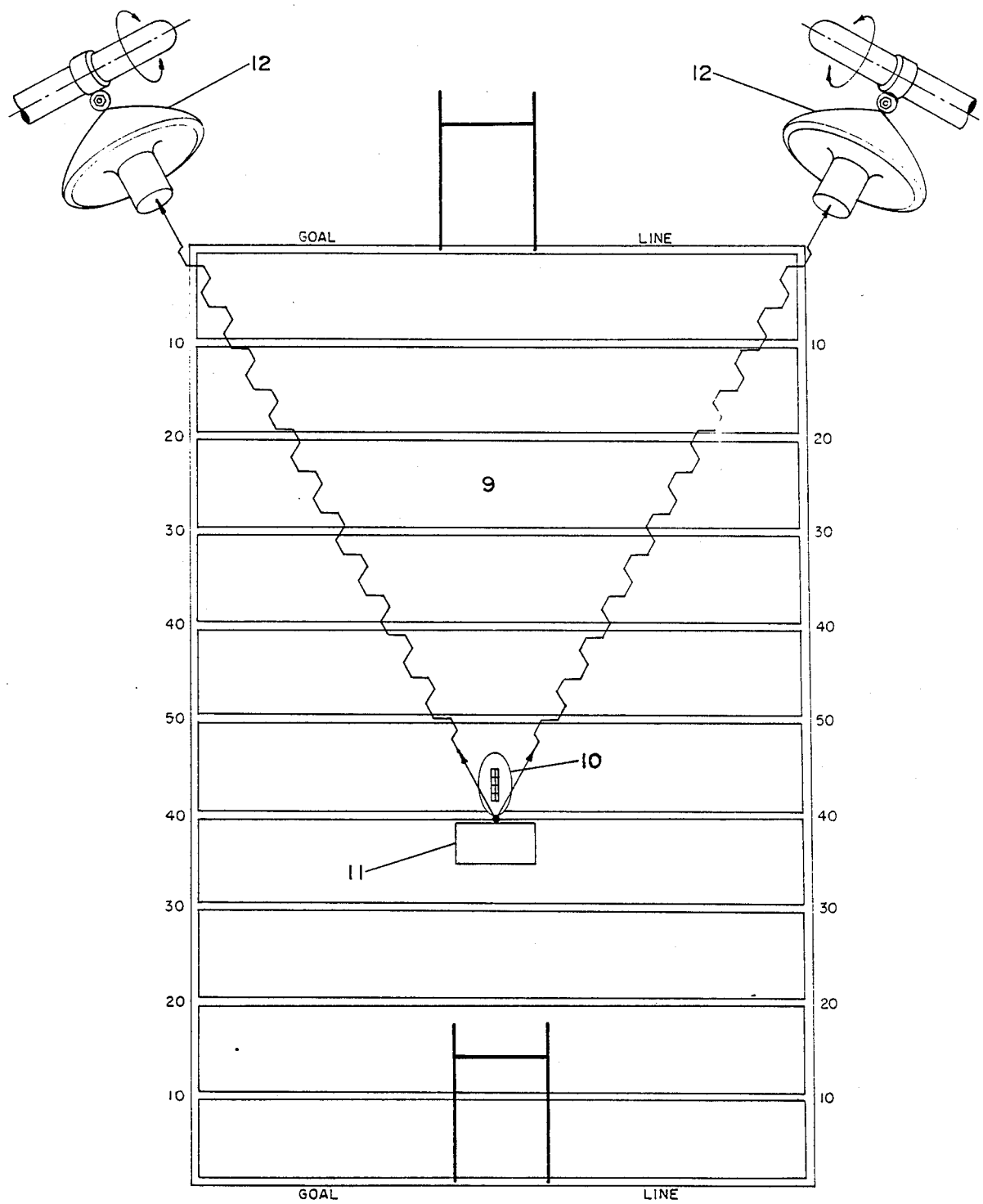
FIG. 1 is a schematic arrangement of the system as it would be arranged for a typical football field.
Figure 2:
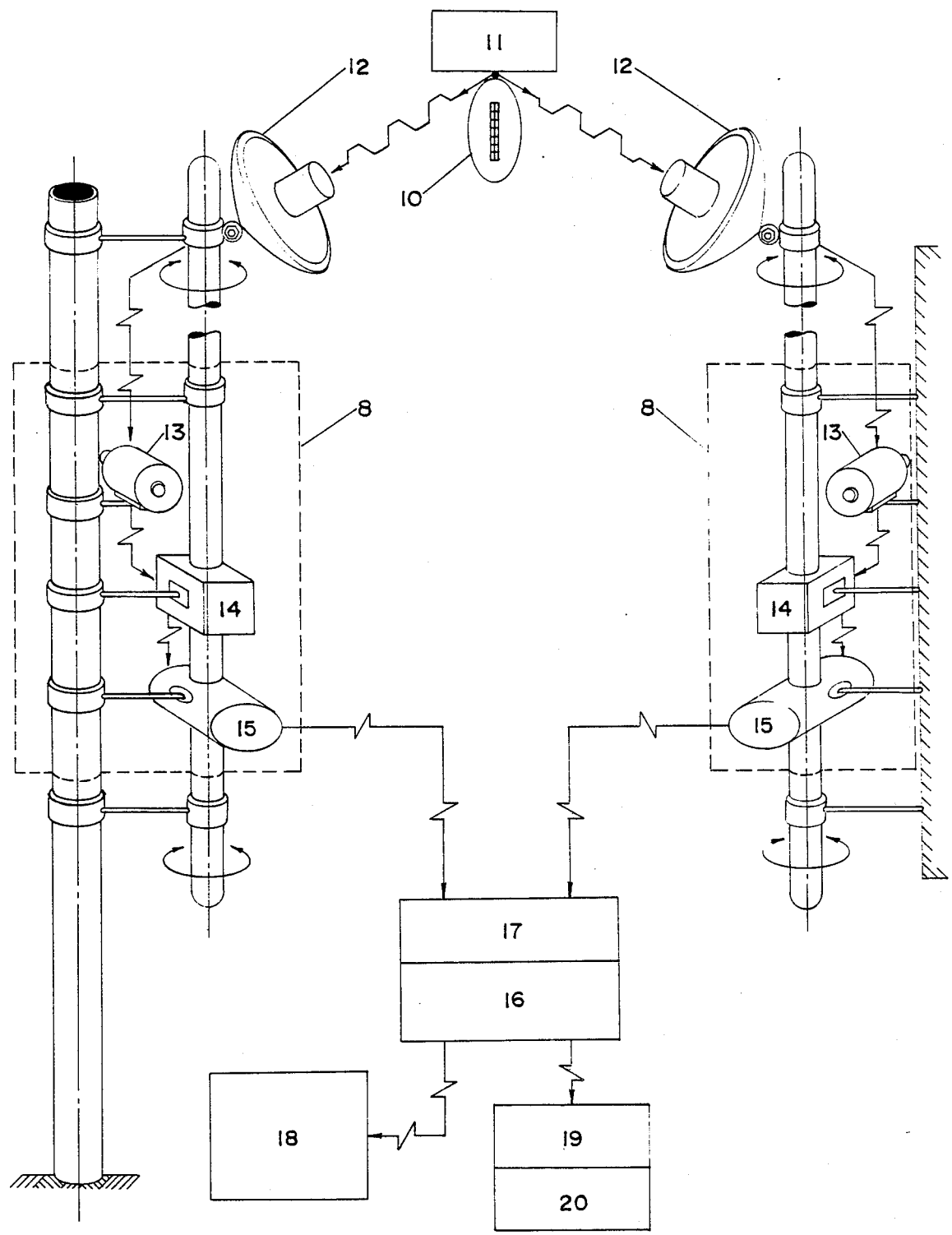
FIG. 2 is a schematic diagram of the electronic system.
Figure 3:
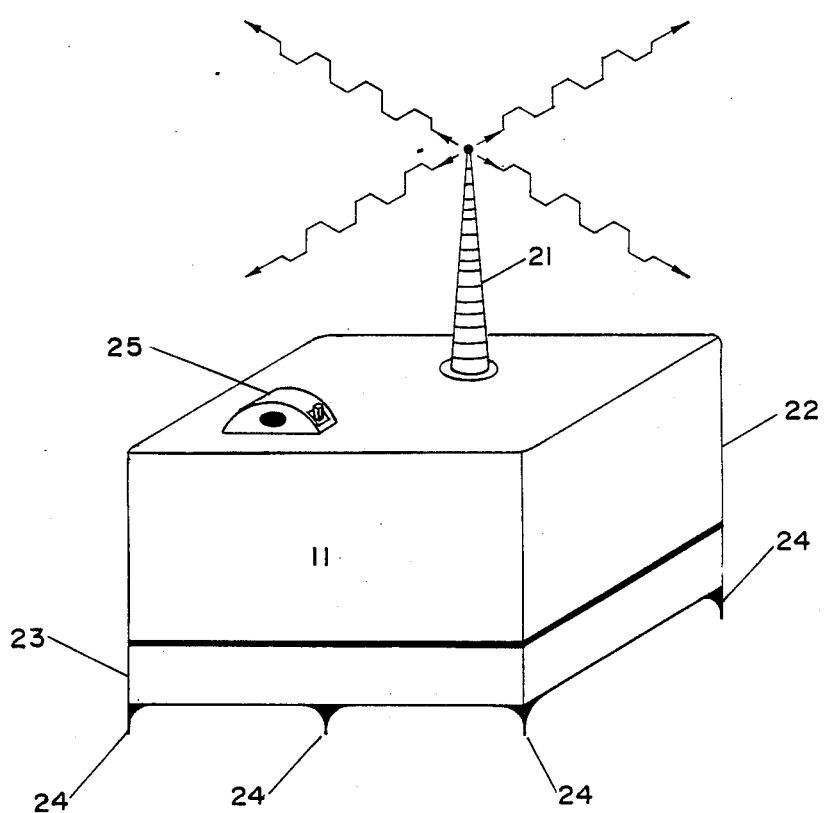
FIG. 3 is a schematic diagram of the transmitter unit.

Referring now to the drawings in greater detail wherein the showings are for the purpose of illustrating a preferred embodied of the invention and not for the purpose of limiting same, FIGS. 1, 2 and 3 illustrate a method of accurately and quickly locating the position of a football on a playing field using a combination of available electronic devices.

In FIG. 1, a portable transmitter, 11, is shown positioned at the point of a football, 10. A pure carrier signal is being emitted from the transmitter. This signal is being received by antennas, 12, which are mounted on poles or other structures at the ends of a football field, 9.

In FIG. 2, the electronic components which are encased in a waterproof housing, 8, are depicted more completely. The receivers, 13, which are connected directly to the antennas, 12, monitor the intensity of the signal from transmitter, 11, and instruct the stepping motors, 14, to rotate the antennas, 12, so that they receive the maximum signal from the transmitter, 11.

The receivers, 13, and the stepping motors, 14, are designed using a closed servo loop to continuously monitor the signal from transmitter, 11, to insure that the extent of rotation is dependent upon the maximum intensity signal to insure exact positioning and ultimate accuracy.

The rotary absolute digital encoders, 15, detect the rotation of the antennas, 12, and the resultant proportional rotation produces digital outputs which represent the amount of rotation from a given reference point.

The outputs of the digital encoders, 15, are connected to the micro-processor, 16, through digital interface cards, 17, in the micro-processor, 16. The micro-processor is programmed so as to compute the various vectors and convert to distance or ball location. The output of the micro-processor would support a large digital display, 18, of the ball location. A video display unit, 19, and control unit, 20, would also be remotely interfaced with the micro-processor for error correction, program changes and for additional displays. The control unit can interrogate the memory unit to obtain the past ball position or to reset the memory to a new one.

FIG. 3 indicates the general arrangement of the transmitter, 11. It includes the transmitter antenna, 21, a battery operated power unit, 22, and a supporting structure, 23. Short spikes, 24, are shown to provide a stable mounting on any type football field surface. In operation, the transmitter unit is positioned at the proper end of the football and energized by the power switch, 25.

The receiving and analytic system determines the ball position and calculates whether a first down has been achieved. It transmits information to the various remote receivers including:
Previous Ball Position
New Ball Position (if required)
Gain or Loss
First Down or Distance Left for a First Down In the case of an incomplete pass or penalty, the control unit can be used to assist in a reposition. The ball is approximately relocated by the head linesman, and the transmitter is positioned at the end of the football and energized. The receivers and micro-computers quickly identify the magnitude and direction of error so that a correction can be made. If first down distance has been achieved, the head linesman resets the first down system.

It is noted that should it be desired, a second set of rotating antenna and receiving components could be installed and would provide additional accuracy for extreme ball positions or greater reliability, should any receiving unit fail during the game.

Note that the micro-computer can also be used as an accumulator to provide a readily available summary of:
yards gained
penalties
yards gained by passing
yards gained by running These and other features can be included by simple additions to the control unit and micro-computer.

Various other modifications of the invention may occur to those skilled and it is desired to secure, by the appended claims, all such modifications as fall within the true spirit and scope of the invention.

What we claim as new and desire to secure by Letters Patents of the United States is:

1. A method for determining on a football field whether an offensive team has successfully gained the ten yards necessary to achieve first down status; to provide accurate football location information for fans, game officials and television; and to facilitate football positioning on the playing field comprising the steps of:
    (1) positioning at the nose of a football a radio transmitter;
    (2) transmitting from said radio transmitter radio waves toward multiple receiving rotating antennas;
    (3) automatically aiming said antennas directly at the said radio transmitter so that the said radio waves represent precise angular directional signals to be used in calculating the position of the radio transmitter and the football on the football field;
    (4) providing said angular directional signals to a microprocessor that has been programmed to calculate the position of the transmitter and football on the football field;
    (5) calculating by triangulation an accurate positioning of the transmitter and football on the football field, where the calculating step particularly includes the step of determining the longitudinal yardage position of the football on the field;
    (6) providing the results of said calculating step to remote display units for fans and television audience; and
    (7) further providing said calculating step results to a control unit for use by said officials, where said control unit is capable of either receiving information from the microprocessor or from manually input information indicating ball position or down number.

2. The method according to claim 1 where the said control unit is designed and programmed to acknowledge the positioning data received from the said microprocessor, said method further comprising the step of displaying to sideline officials the exact position of the football and the number of yards to go for the next first down, said displaying step also including the displaying of the position of the football when the first down for the series of plays in progress was initiated, with all displays accomplished by this displaying step displayed in a digital manner and with the control unit capable of being overridden by the operator by said operator switching from an automated mode to a manual mode where said manual mode allows adjustments to the data received from said microprocessor to allow for unforseen circumstances, changes resulting from official decisions or from data distorted through manual input.

3. The method according to claim 2, where said displaying step is accomplished by a digital display board that is designed and programmed to accept information from said microprocessor and display it digitally on a scoreboard television monitor, or any other visual display system adapted to receive said data representing said position of the football and data representing said down number and the yards to go for the first down.

4. The method of claim 1 further comprising the steps of:
    (8) monitoring the functions of the control unit;
    (9) establishing a data bank containing statistics for all segments of the game including but not limited to total yards gained or lost rushing, total yards gained or lost passing, kicking yardage, total number of first downs, total number of third down attempts, total number of third down attempts that were successful or unsuccessful, and other pertinent data that can be displayed on demand for the enlightment and enjoyment of the game crowd, the television viewing public, television announcers, official scorers and others where said data bank is updated continuously as the game progresses and where said microprocessor is programmed to extract from said data bank a summary of all the statistics for analysis at half-time and at the end of the game
and where said monitoring and establishing steps are accomplished by said microprocessor.

5. The method as claimed in claim 1 where said method includes the step of assisting said game officials in making the correct adjustment to the position of the football for the various penalties assessed during the game where said correct adjustment is made according to a particular rule covering each of said various penalties, where each rule is assigned a particular code that is manually input into the control unit when a penalty occurs, where said correct adjustment is calculated based upon said manually input code and said correct adjustment is made by said game officials after the correct position of the football is displayed automatically and in response to audible or visual signals which inform the said game officials as to the correctness of the placement of the football.

6. The method of claim 1, where the components which perform the method are continuously checked by a functionally independent back up arrangement which adjusts said components as necessary and where said back up arrangement stands ready to take over instantaneously should any of said components fail.

7. The method of claim 1 where the equipment designed to carry out said method will do so under any and all climatic conditions such as, but not limited to, snow, sleet, rain, hail, wind and mud which may occur before or during a football game, where said equipment contains design features including, but not limited to moisture protection and shock proof electronic and electrical components.

* * * * *